United States Patent [19]

Hamao et al.

[11] Patent Number: 5,293,398

[45] Date of Patent: Mar. 8, 1994

[54] DIGITAL MATCHED FILTER

[75] Inventors: Noriyuki Hamao; Masahiro Hamatsu, both of Tokyo, Japan

[73] Assignee: Clarion Co., Ltd., Tokyo, Japan

[21] Appl. No.: 990,291

[22] Filed: Dec. 14, 1992

[30] Foreign Application Priority Data

Dec. 13, 1991 [JP] Japan .................. 3-352018
Mar. 6, 1992 [JP] Japan .................. 4-084666

[51] Int. Cl.⁵ .................. H04L 9/00; H04L 27/30
[52] U.S. Cl. .................. 375/1
[58] Field of Search ............ 375/1, 96; 370/18; 455/38.1

[56] References Cited

U.S. PATENT DOCUMENTS 4,691,326  9/1987  Tsuchiya .................. 375/1
5,210,770  5/1993  Rice .................. 375/1
5,220,580  7/1993  Herberle et al. .................. 375/1
5,237,586  8/1993  Bottomley .................. 375/1

*Primary Examiner*—Salvatore Cangialosi
*Attorney, Agent, or Firm*—Flynn, Thiel, Boutell & Tanis

[57] ABSTRACT

In a digital matched filter used as a correlator in a receiver in an SSC system, different bits of a received signal converted into a multi-bit signal are inputted into different correlators. After having weighted different correlation outputs, the different weighted correlation outputs are added together and weighting factors are varied, depending on a synthesized correlation output obtained by addition. When such a matched filter is used in an SSC system, it is possible to obtain precisely a desired signal without controlling transmission electric power.

4 Claims, 17 Drawing Sheets

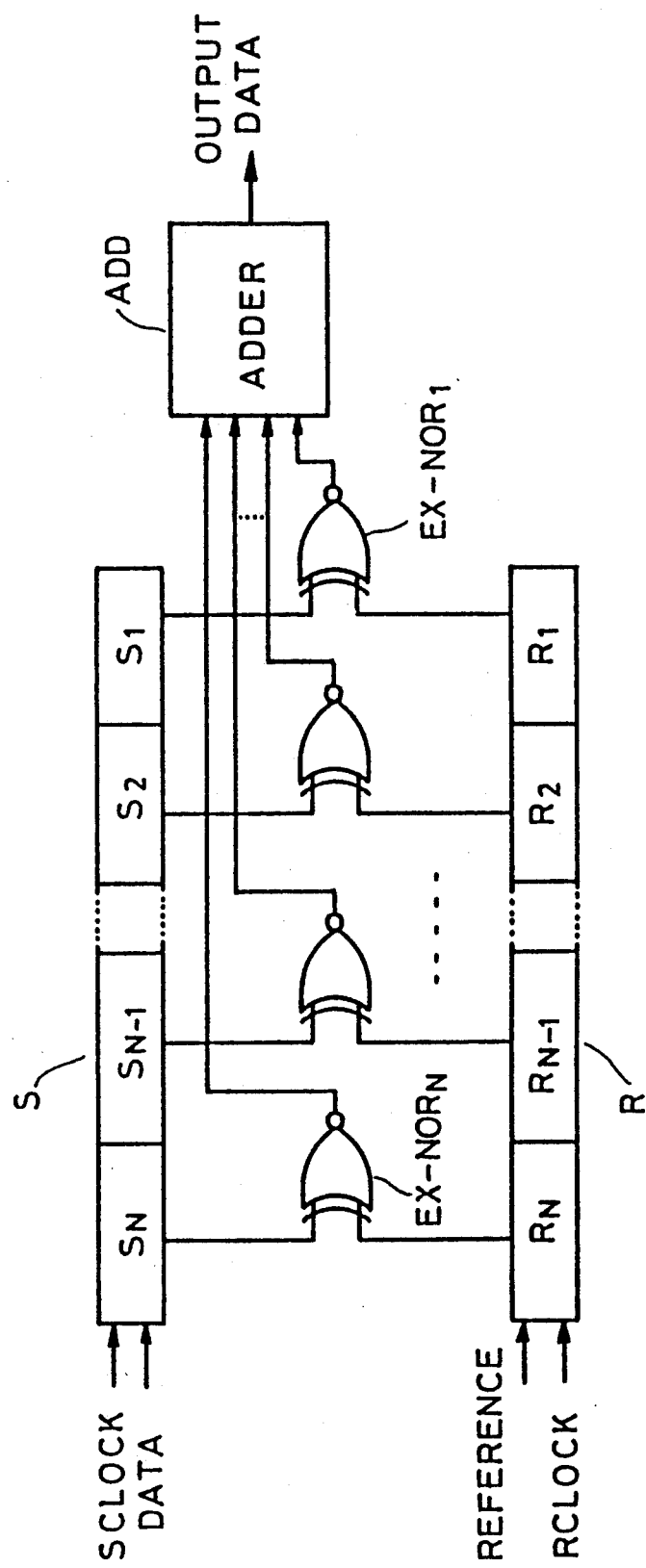

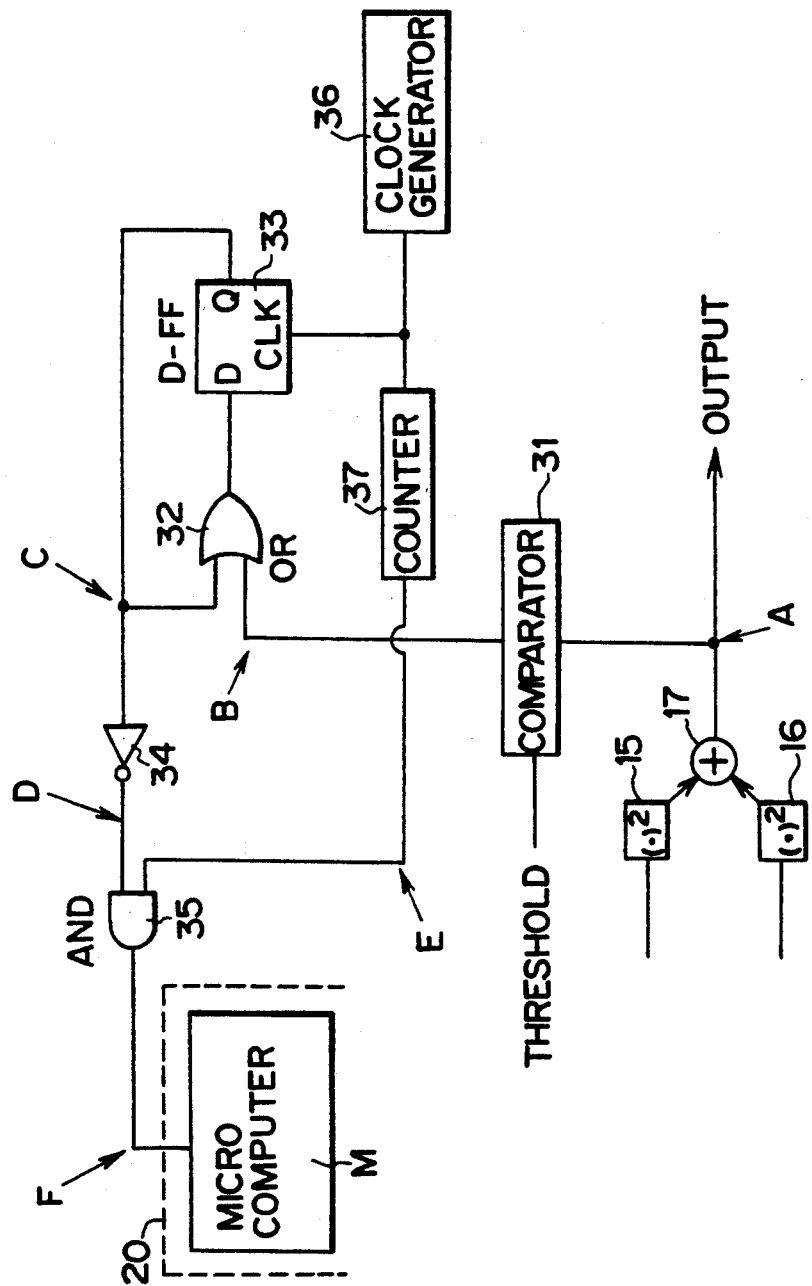

INITIAL CONDITION

FIRST STEP

THIRD STEP

SECOND STEP

FIG. 11
(a)
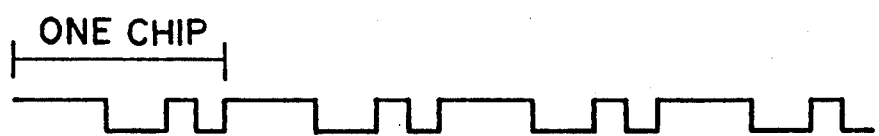
+
(b)
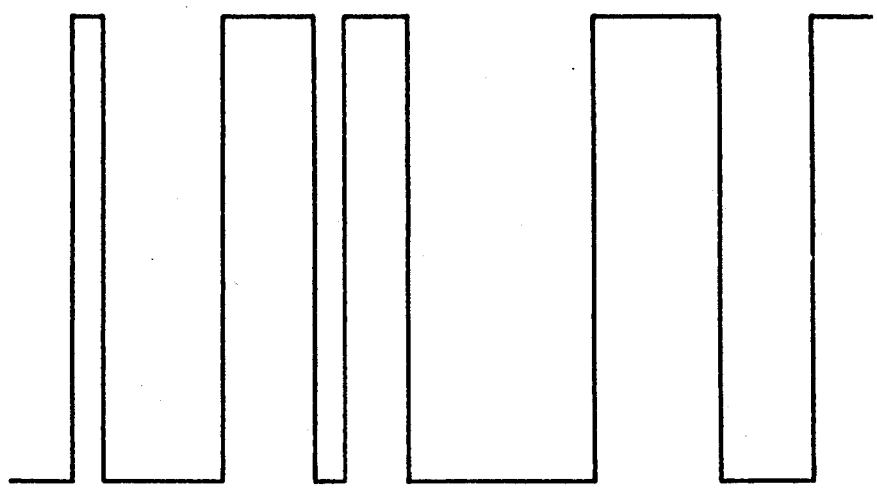
=
(c)
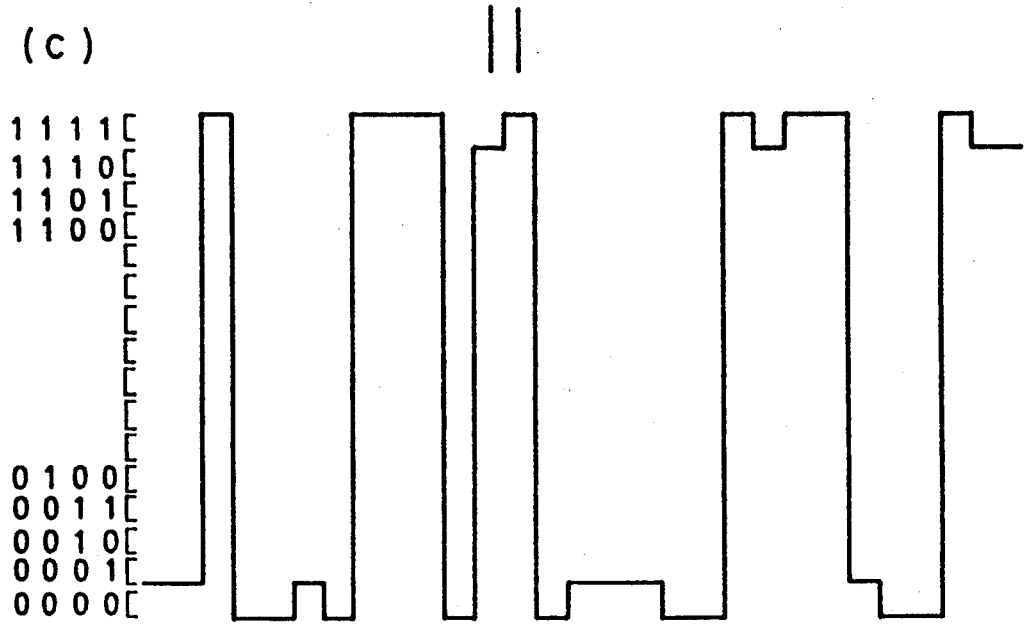

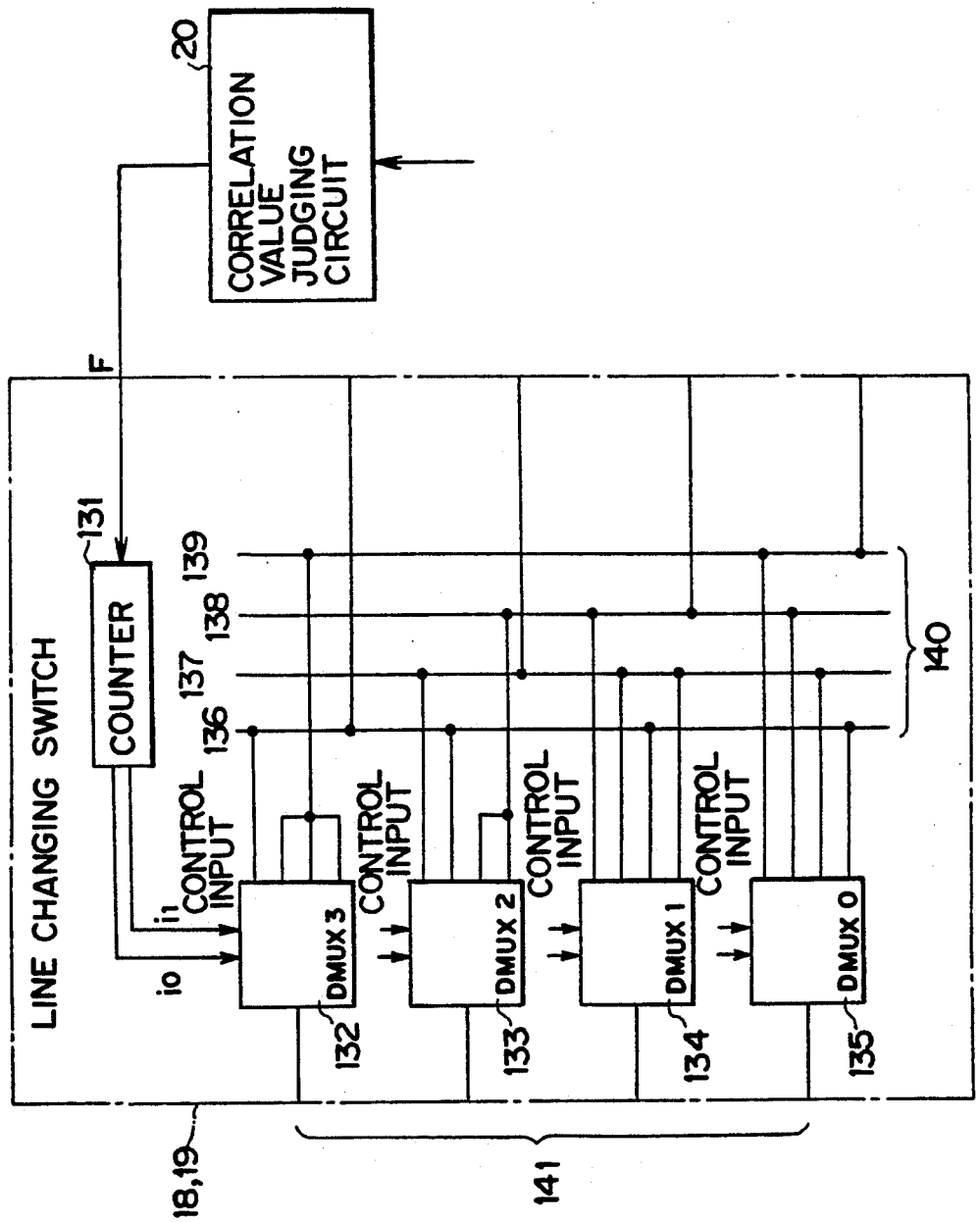

| $i_1$ $i_0$ | $O_0$ $O_1$ $O_2$ $O_3$ |
|---|---|
| 0  0 | $I_0$  X  X  X |
| 0  1 | X  $I_0$  X  X |
| 1  0 | X  X  $I_0$  X |
| 1  0 | X  X  X  $I_0$ |

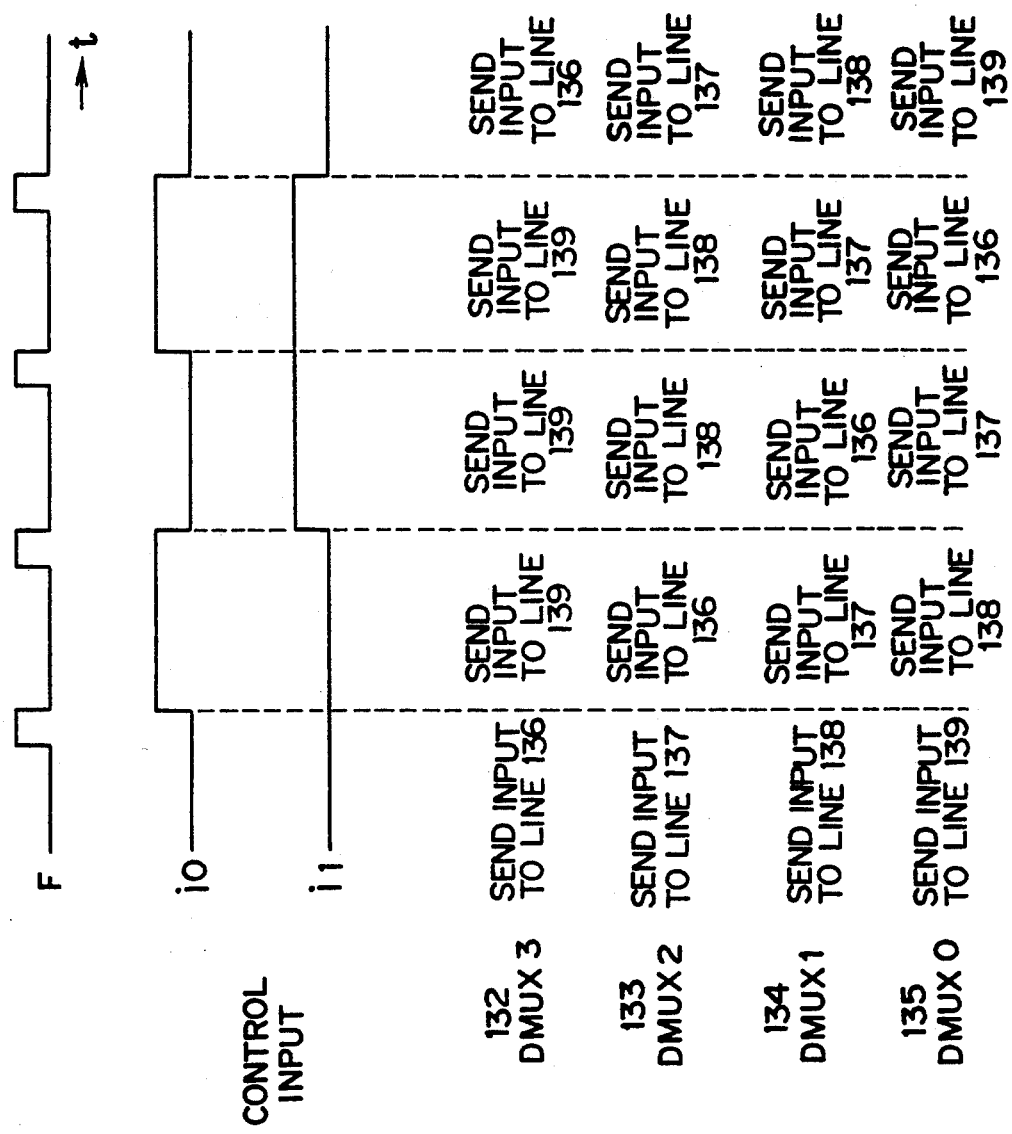

DIGITAL MATCHED FILTER

FIELD OF THE INVENTION

The present invention relates to a digital matched filter suitable for a spread spectrum communication (hereinbelow abbreviated to SSC) system, etc. and in particular to a construction for improving a method for weighting digital correlation values therefor.

BACKGROUND OF THE INVENTION

A correlator is used in a receiver in an SSC system, e.g. receiver indicated in FIG. 1 in U.S. Pat. No. 4,691,326. FIG. 10 shows the construction of a general asynchronous type 4-bit judgment digital matched filter serving as such a correlator, etc., in which reference numeral 1 and 2 are multipliers; 3 is a carrier oscillator; 4 is a 90° phase shifter; 5 and 6 are low pass filters (LPF); 7 and 8 are A/D converters; 9 and 10 are correlators; 11 and 12 are fixed type weighting circuits; 13, 14 and 17 are adders; and 15 and 16 are squaring circuits. As indicated in the figure, when an asynchronous type digital matched filter receives a signal, it divides received wave into two parts and thus separates the received signal into two signals, called I channel and Q channel, by multiplying signals having the same frequency as the carrier of the received signal, whose phases are shifted by 90° from each other, by the two parts of the received wave in the multipliers 1 and 2, respectively, to convert them in frequency into a base band. Thereafter the two signals are A/D-converted by the A/D converters 7 and 8 through the low pass filters 5 and 6, respectively, to transform the received signal into multi-bit signals. Then, in order to obtain a correlation value, each of the bit signals is correlated with reference data by each of the correlators 9. Thereafter, for the I channel, different bits of correlation values thus obtained are weighted by different weighting circuit 11 and added together by the adder 13. The same operations are effected also for the Q channel. The correlation values thus obtained for the I channel and the Q channel are squared by the squaring circuits 15 and 16, respectively, and added to each other by the adder 17 to obtain a final correlation value.

(c) in FIG. 11 indicates the waveform of the received wave at a point A in FIG. 10, which is a synthesized wave of a desired wave (a) and a non-desired wave (b) in FIG. 11 and has an amplitude corresponding to one of digital values from 0000 to 1111.

Further (a) in FIG. 12 indicates waveforms of different bits $B_0$ to $B_3$ at a point B in FIG. 10; (b) in the same figure indicates waveforms of correlation values $C_0$ to $C_3$ of the different correlators 0 to 3 at a point C in FIG. 10; and (c) in the same figure indicates a waveform of the correlation value obtained by the addition at a point D in FIG. 10.

However, by the prior art method described above, although an ideal correlation value can be obtained, when a desired wave signal is sufficiently great with respect to other disturbance, D/U increases, when the source transmitting the desired wave is far, when a number of SSCs exist simultaneously etc., and most of desired wave information is not always included in significant bits after it has been decomposed into different bits by an A/D converter. Therefore it had a drawback that, in such a case, electric power should be controlled so that transmission electric power of a desired wave transmitter is increased.

OBJECT OF THE INVENTION

The object of the present invention is to provide a digital matched filter capable of solving the drawback of the prior art technique described above and obtaining precisely a desired signal, while exhibiting a same effect by processing on the receiver side as that obtained by the electric power control on the transmitter side.

SUMMARY OF THE INVENTION

In order to achieve the above object, the digital matched filter according to the present invention comprises frequency converting means for converting a received signal in frequency into a base band by using a signal having a same frequency as a carrier of the received signal; A/D converting means for converting a signal obtained by the frequency conversion into a multi-bit signal; a plurality of digital correlators for correlating different bit signals of said multi-bit signal with a set signal to output respective correlation values; a plurality of weighting means for weighting differently outputs of the different correlators; synthesizing means for combining outputs of the weighting means; a judging circuit for comparing an output of the synthesizing means with a predetermined value to output a control signal, based on a comparison result thus obtained; and control means for varying weighting factors, based on the control signal.

In the digital matched filter by the multi-bit judgment method according to the present invention, after the received signal has been converted into a multi-bit signal, the different bits are correlated with predetermined values. The different correlation values are weighted and added together to obtain the final correlation value. The weighting stated above can be varied differently for different bits.

BRIEF DESCRIPTION OF THE DRAWINGS

FIG. 4 is a block diagram showing an example of the construction of a digital correlator;

FIG. 7 is a block diagram showing the construction of a correlation value judging circuit.

FIG. 11 shows a waveform of a signal inputted to the circuit indicated in FIG. 10;

FIG. 14 is a block diagram showing an example of the construction of a line changing switch;

FIG. 16 is a diagram for explaining the operation of the switch indicated in FIG. 14.

DETAILED DESCRIPTION

Figure 1:
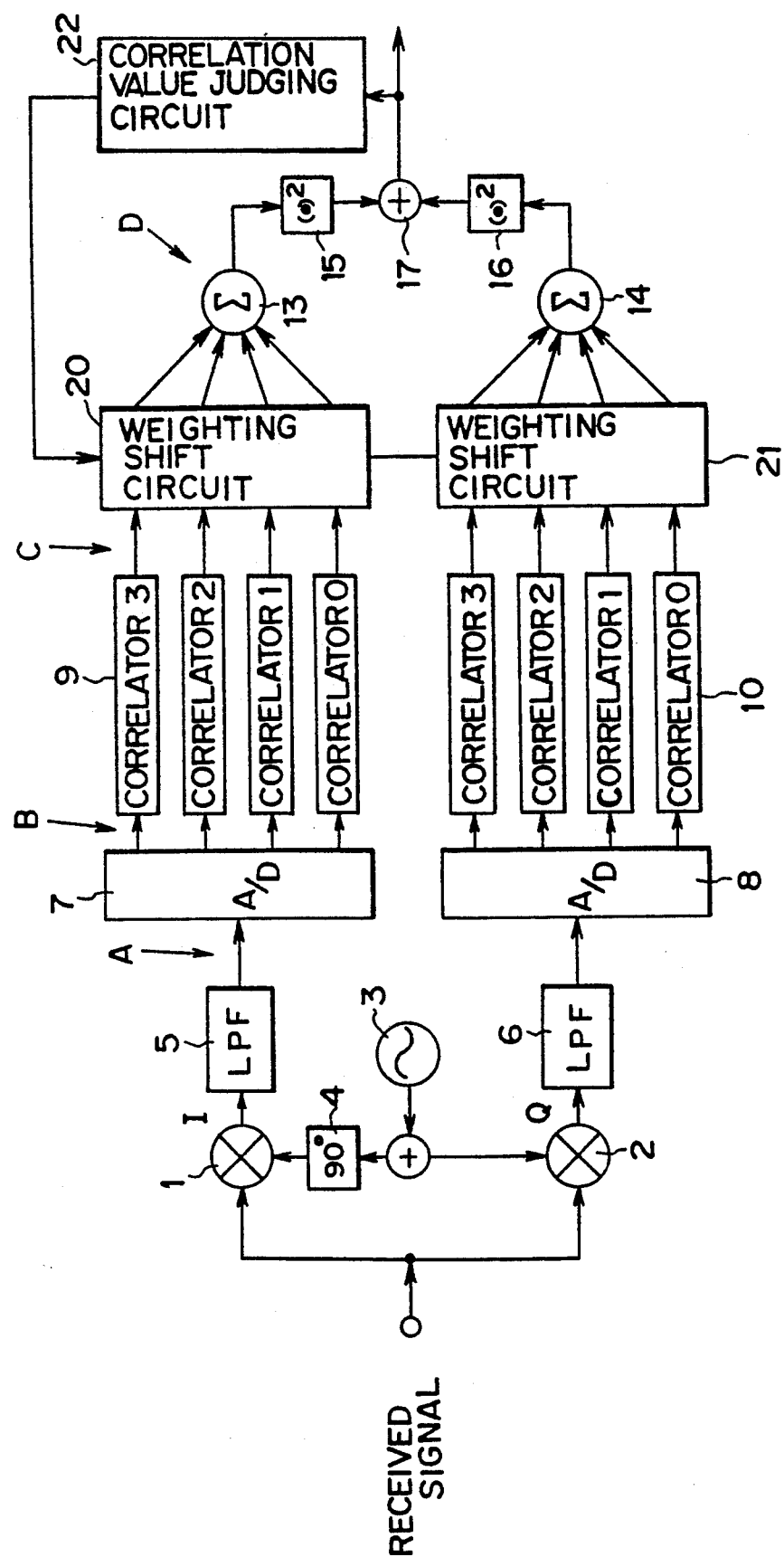
FIG. 1 is a block diagram showing the construction of a digital matched filter according to an embodiment of the present invention.
Figure 2A:
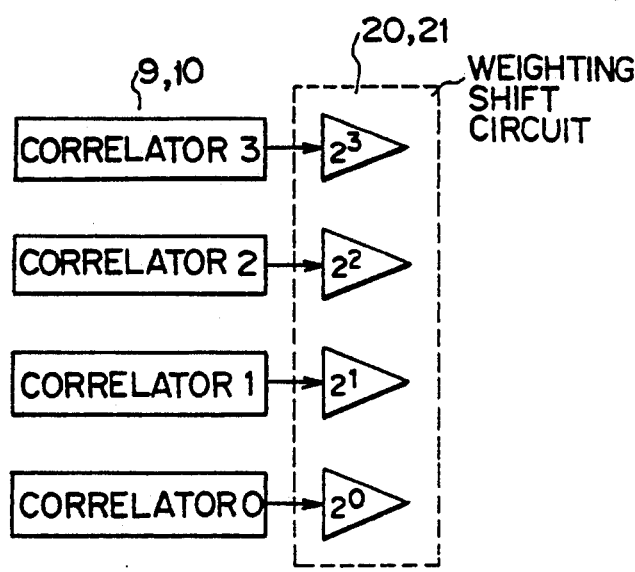
FIGS. 2A, 2B and 2D are diagrams for explaining the operation of the above embodiment.
Figure 2B:
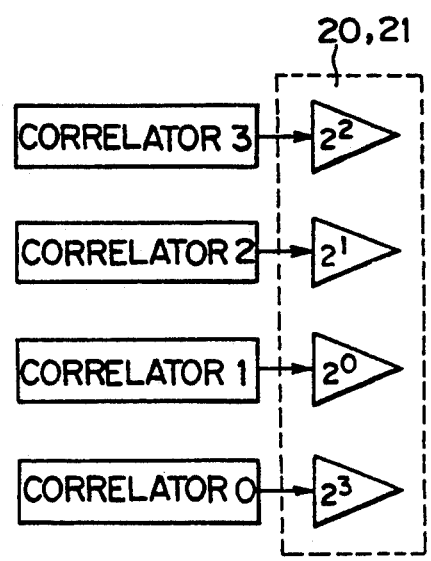
Figure 2C:
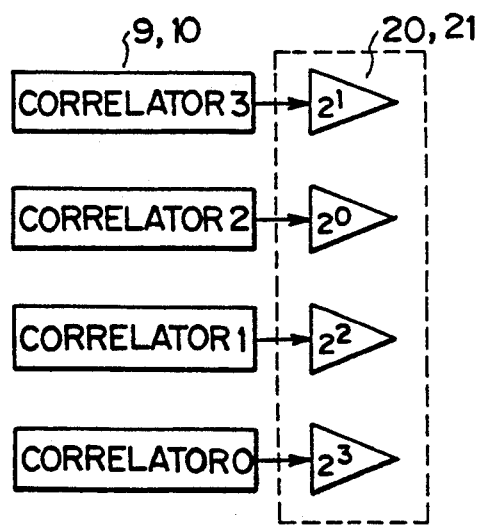
Figure 2D:
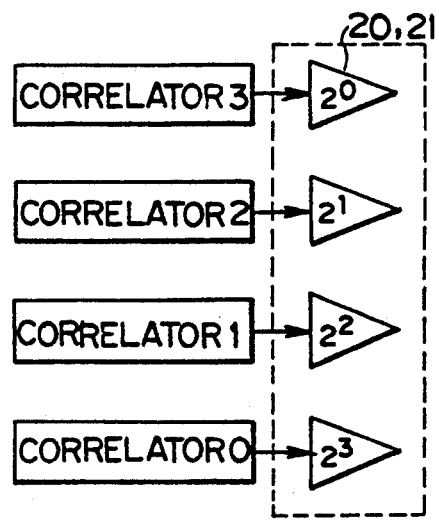

Hereinbelow several embodiments of the present invention indicated in the drawings will be explained.

Figure 10:
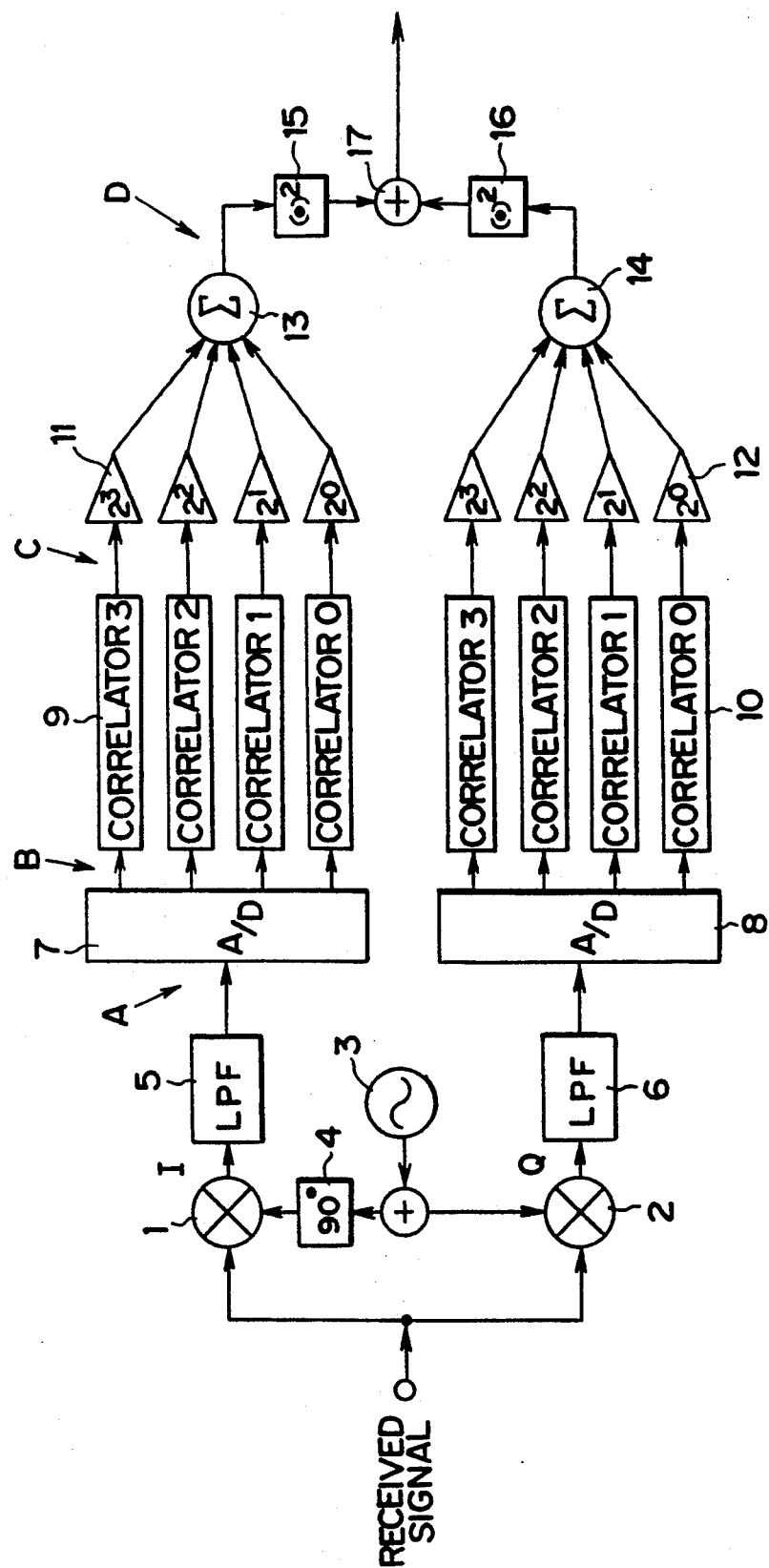
FIG. 10 is a block diagram showing the construction of a prior art digital matched filter.
Figure 12A:
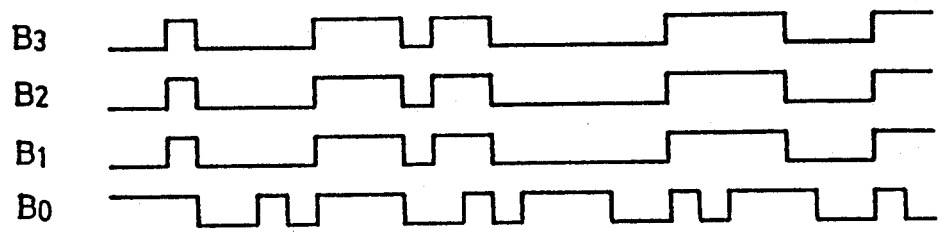
FIGS. 12A, 12B and 12C show waveforms at different parts in the circuit indicated in FIG. 10.
Figure 12B:
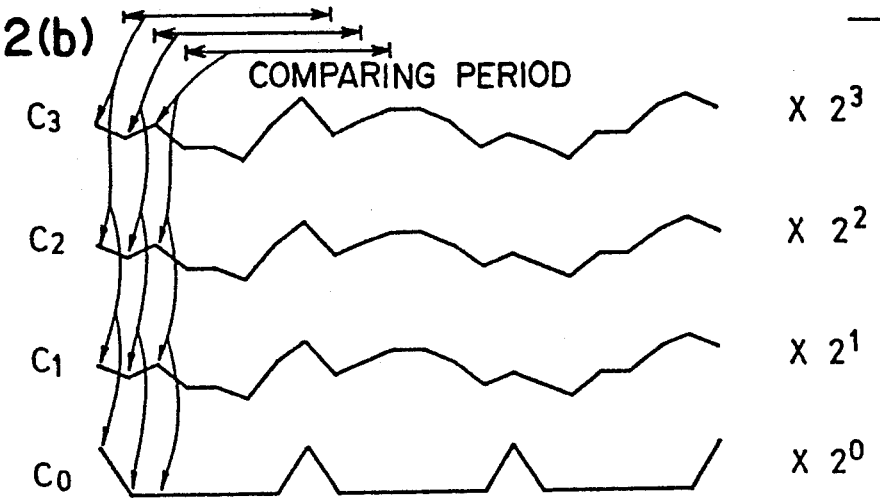
Figure 12C:
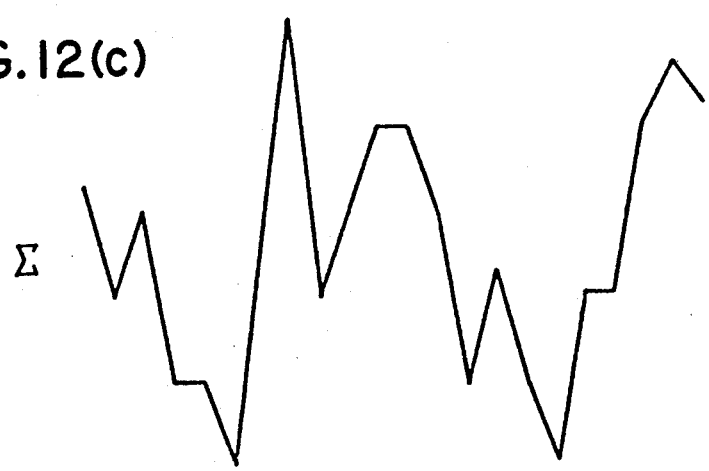

FIG. 1 shows an embodiment of the digital matched filter according to the present invention and the same reference numerals as those used in FIG. 10 represent same or analogous circuits. The difference thereof from that indicated in FIG. 10 consists in that weighting shift circuits 20 and 21 are disposed in lieu of the prior art weighting circuit and a correlation output is judged by a correlation value judging circuit 22 so that different weighting factors can be varied for different bits of a multi-bit signal. These weighting shift circuits correspond to the weighting means and the control means described previously.

According to the present invention, in the case where no satisfactory correlation output can be obtained, weighting factors are shifted. This weighting shift is effected by the method indicated in FIG. 2. At first, in the case where no satisfactory correlation value is obtained in the first state indicated by (a) in FIG. 2, the weighting factors are changed as indicated by (b) in the same figure. In the case where no satisfactory correlation value is nevertheless obtained, it is changed to (c) or further to (d) in the same figure. In the FIG. $2^0$ to $2^3$ are weighting factors. This is equivalent to amplification of a small desired signal and therefore it can be expected to improve the correlation output. Although here 4-bit judgment is taken as an example, a clearer effect can be obtained by a similar method, also in the case where the number of bits is increased.

Figure 3A:
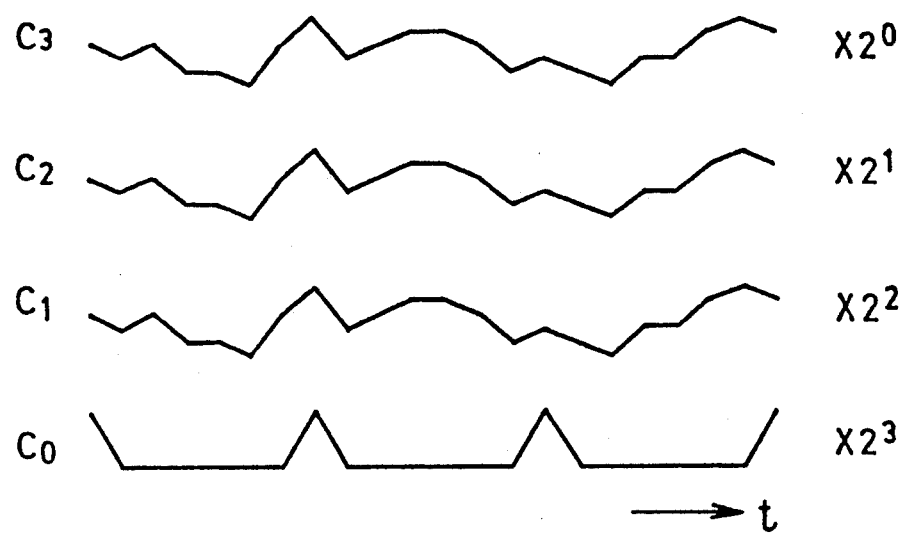
FIGS. 3A and 3B show waveforms at points C and D in the above embodiment.
Figure 3B:

(a) and (b) in FIG. 3 show waveforms at points C and D, respectively, in the embodiment described above. The waveforms at points A and B are identical to those indicated in FIG. 11.

Now principal circuits in the embodiment described above will be explained.

The correlators 9 and 10 described previously compare one data set of the set signal with one data set of the received signal chip by chip to output numbers of accordance between the set signal and the received signal in every data set and a circuit generally used therefor is indicated in FIG. 4.

In the figure, S and R are N-bit shift registers; EX-$NOR_1$ to EX-$NOR_N$ are exclusive nor circuits; and ADD is an adding circuit.

As an example, it is supposed that 1 data length in FIG. 4 is 31 chips (N=31). At first, a code of the set signal REFERENCE is stored in the different bits $R_1$ to $R_N$ of the register R in this figure, responding to a clock RCLOCK for every chip. Thereafter base band information DATA of the received signal is inputted successively to the register S, responding to a clock SCLOCK. At this time, when contents of $S_1$ and $R_1$, $S_2$ and $R_2$, ... $S_{31}$ and $R_{31}$ are in accordance with each other, respectively, outputs 1 are outputted by EX-$NOR_1$ to EX-$NOR_N$ and they are added together by the adding circuit ADD.

Figure 5:
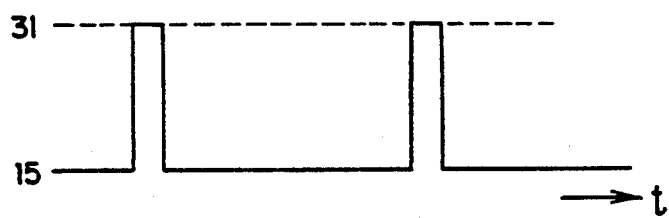
FIG. 5 shows a waveform of an output of the above correlator.

The output data calculated in this way have a waveform indicated in FIG. 5, if the set signal and the received signal have a same code.

The construction and the operation of the weighting shift circuits 20 and 21 are as indicated in FIGS. 6(a) to 6(e).

Figure 6A:
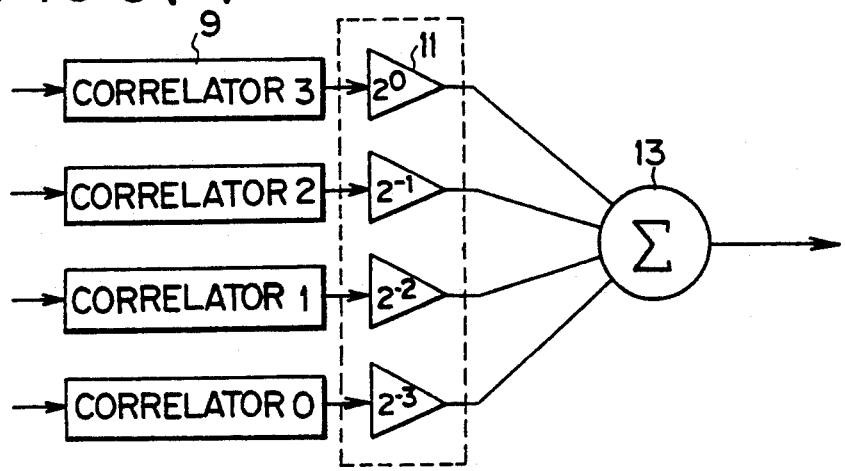
FIGS. 6(a) and 6(b) are diagrams for explaining the operation of a prior art weighting shift circuit.
Figure 6B:
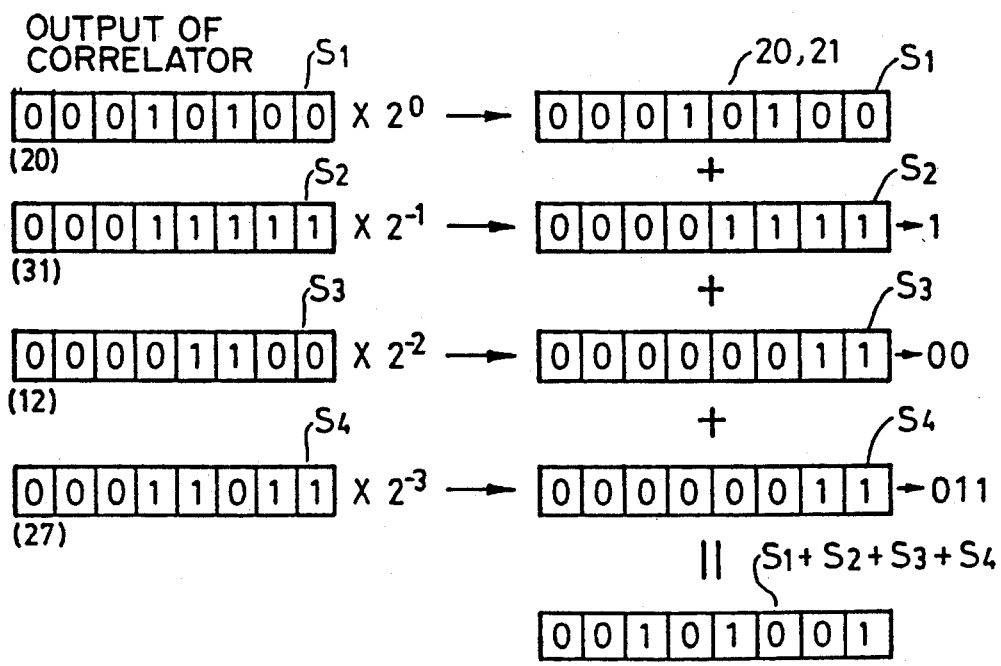
Figure 6C:
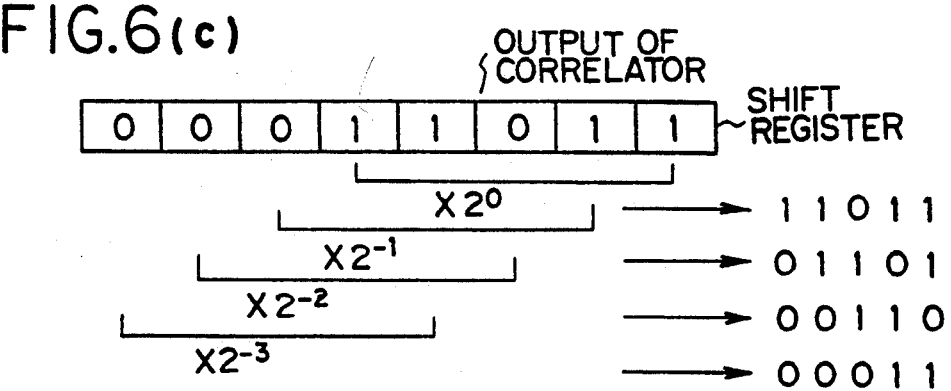
FIG. 6(c) is a diagram for explaining the operation of a weighting shift circuit according to the present invention.
Figure 6D:
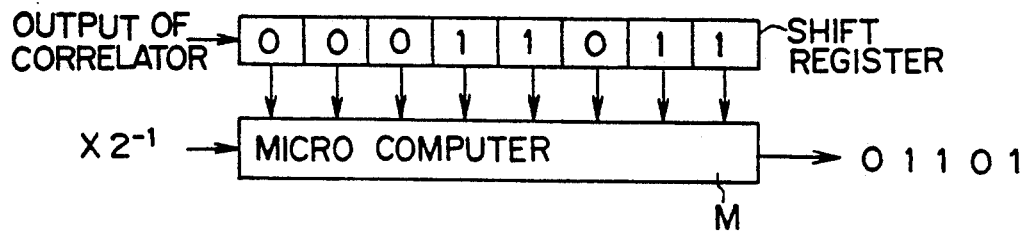
FIGS. 6(d) and 6(e) are block diagrams showing an example of the weighting shift circuit.

As described above, the output of the correlators is the output value of the adder ADD in FIG. 4. Therefore this value is represented by a binary number. By the prior art technique, as indicated by this value of the correlators, "a fixed weighting" is given by the weighting circuit 11. Although it is written here as $2^3$, $2^2$, $2^1$, $2^0$, it is $2^0$, $2^{-1}$, $2^{-2}$, $2^{-3}$ in reality, indicated in FIG. 6(a). Here the fact that this "weighting" is given to binary correlation values outputted by the correlators means that the different correlation values are put in the shift registers $S_1$ to $S_4$ of four stages, as indicated in FIG. 6(b) and that they are so processed that when the weighting factor for $S_1$ is $2^0$, the output of the correlator is held as it is; when it is $2^{-1}$, the output of the correlator is shifted to the right by 1; similarly when it is $2^{-2}$ and $2^{-3}$, the output of the correlator is shifted by 2 and 3, respectively, and the results thus obtained are added together. It is conceivable that this means also that some parts of the outputs of the correlators inputted to the shift registers, i.e. contents of some stages of the shift registers, are pulled out, as indicated in FIG. 6(c). By the prior art technique these pulled-out parts were fixed for each of the correlators and on the contrary, according to the present invention, it is arbitrarily varied from which stages of the shift registers the contents are pulled out.

Figure 6E:
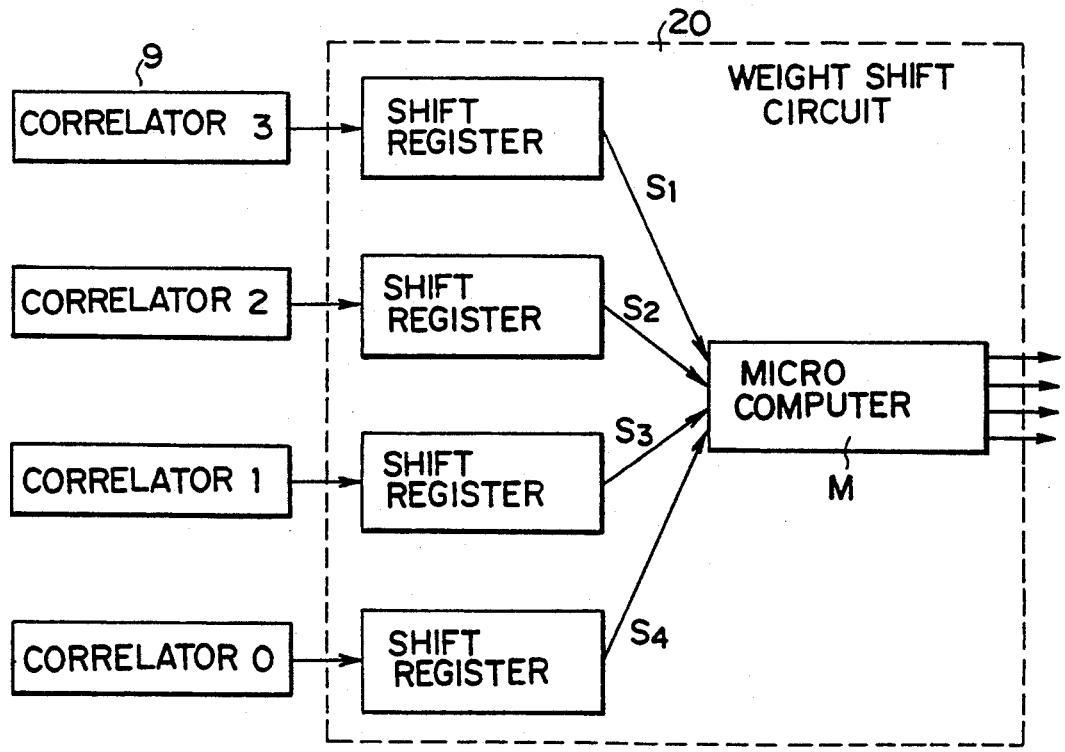

As described above, the weighting can be changed, depending on which stages of the shift registers the contents are pulled out. It may be programmed e.g. in the microcomputer 17, as indicated in FIG. 6(c), in what manner they are pulled out. Therefore, in the weighting shift circuit, the weighting factors can be changed e.g. by changing the shift registers $S_1$ to $S_4$ of four stages serving as weighting means and the manner in which the contents of the different stages in the different shift registers are changed according to a predetermined program as indicated in FIG. 6(c) by means of the microcomputer 17, as indicated in FIG. 6(e).

FIG. 7 shows an example of the construction of the correlation value judging circuit 22, in which reference numeral 31 is a comparator; 32 is an OR circuit; 33 is a D type flipflop; 34 is an inverter; 35 is an AND circuit; 36 is a clock generator; and 37 is a counter.

At first, a threshold of suitable level is given to the comparator 31 in advance. When the correlation peak, which is the final output of the correlator from the adder 17, doesn't exceed this threshold, the output of the OR circuit 32 remains at "0". However, when the correlation peak exceeds the threshold even once, since "1" is latched by the flipflop 33, the output of the OR circuit 32 is "1". Thereafter a signal, which has passed through the inverter 34, and a pulsed signal obtained by dividing the output of the clock generator 36 by the number of chips by means of the counter 37 are added by the AND circuit 35 to obtain a shift signal, which is to be sent to the microcomputer M. Receiving this signal, the microcomputer M changes the weighting as stored in advance.

Figure 8:
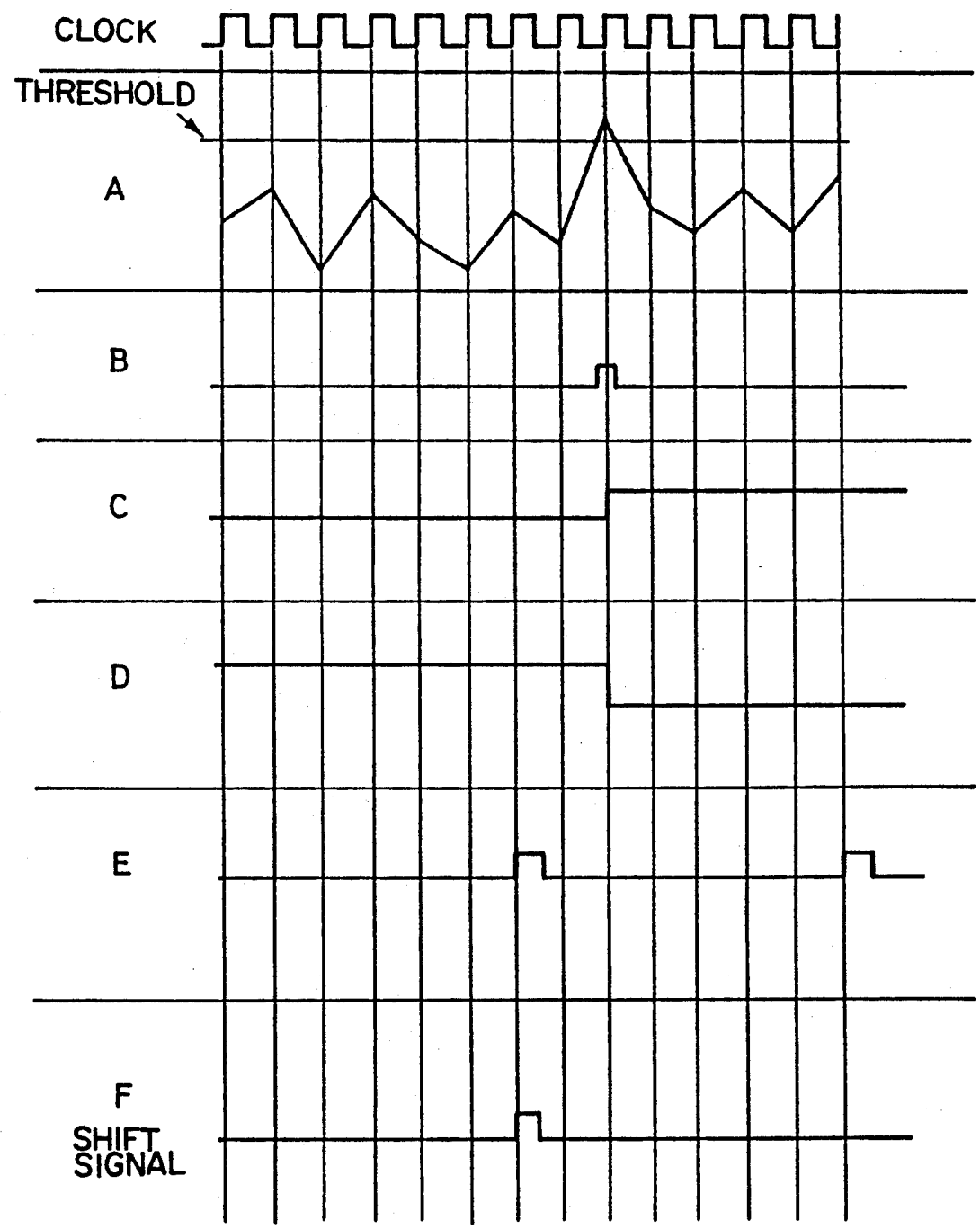
FIG. 8 shows waveforms at different parts in the circuit indicated in FIG. 7.
Figure 9A:
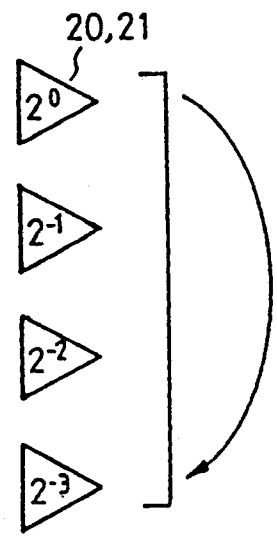
FIGS. 9A, 9B, 9C and 9D are diagrams for explaining the operation of the weighting shift by the circuit indicated in FIG. 7.
Figure 9B:
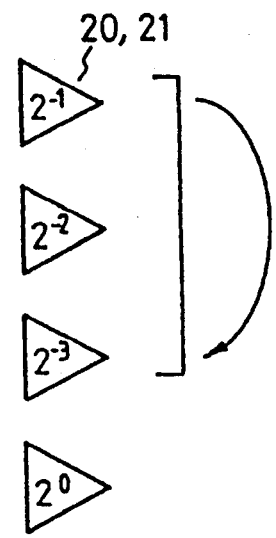
Figure 9C:
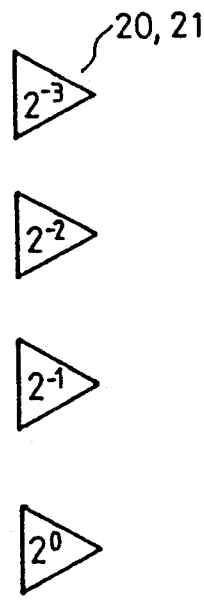
Figure 9D:
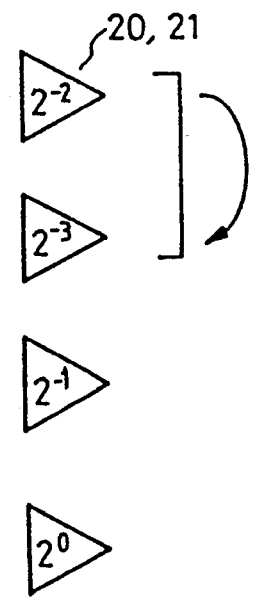

FIG. 8 shows a timing chart indicating this operation. For the sake of simplifying the figure, it is supposed here that the number of chips is 7.

FIG. 9 shows an example of the weighting shift by means of the correlation value judging circuit described above. In this figure a case of a 4-bit judgment is taken as an example. At first, when no satisfactory output is obtained by the original weighting, considering the four weighting factors, the uppermost one is displaced to the lowermost. In the case where nevertheless no satisfactory output can be obtained, considering only the upper three weighting factors, the uppermost one is displaced to the lowermost. In the case where nevertheless still no satisfactory output can be obtained, considering only the upper two, they are replaced with each other. The weighting factors are changed, as described above, until an ideal output is obtained. This procedure is valid also for 8 bits, etc. In the case of 8 bits, at first the uppermost one is displaced to the lowermost. Next, considering the upper seven weighting factors, the uppermost one displaced to the lowermost.

Figure 13:
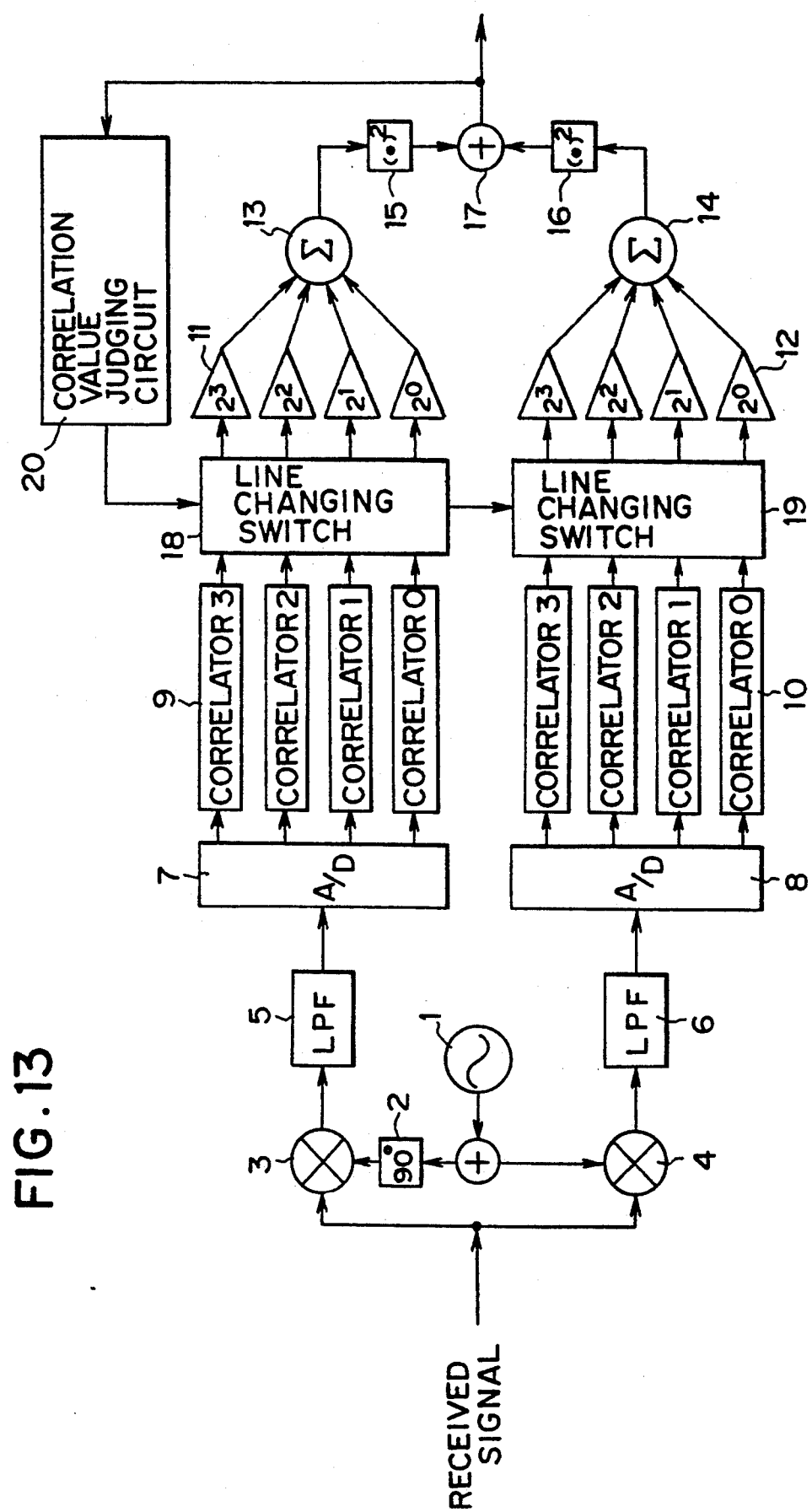
FIG. 13 is a block diagram showing the construction of a digital matched filter according to another embodiment of the present invention.

FIG. 13 shows another embodiment of the digital matched filter according to the present invention and the same reference numerals as those used in FIG. 1 represent same or analogous circuits. In the present embodiment, there are disposed further line changing switches 18 and 19 serving as the control means described above on the output side of the correlators 9 and 10. When it is judged by the correlation value judging circuit 22 that the correlation value of the correlation signal has exceeded the predetermined value, the switch is driven by the judgment output and the weighting is varied substantially without shifting the weighting factors themselves so as to obtain a correlation signal having a desired correlation value.

Figures 15A, 15B:
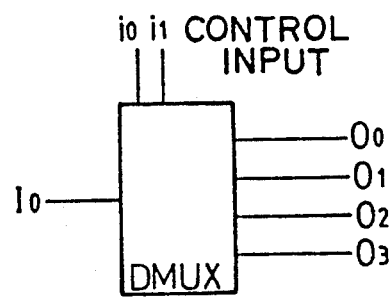
FIGS. 15(a) and 15(b) are diagrams for explaining the operation of a demultiplexer.

FIG. 14 shows an example of the construction of the wire shunting switches 18 and 19, in which reference numeral 131 is a quarternary counter and 132 to 135 are demultiplexers. Each of the demultiplexers connects an input $I_0$ with either one of four outputs as indicated in FIG. 15($b$), responding to control signals $i_0$ and $i_1$, as indicated in FIGS. 15($a$) and 15($b$).

In FIG. 14, when a pulse F is outputted by the correlation value judging circuit 22 so as to change lines, it is inputted to the quarternary counter 131, which outputs the control signals $i_0$ and $i_1$ of 2 bits. These control signals $i_0$ and $i_1$ are inputted to all of demultiplexers 132 to 135, which effect switching operation so as to connect lines 136 to 139 one after another. On the other hand, lines 140 are connected in an order, in which the lines are changed, as indicated in the figure. The inputs 141 of the demultiplexers are connected with the outputs of the different correlators 18 and 19 and the lines 140 are connected with the inputs of the different weighting circuits 11 and 12.

Consequently, every time the pulse F is sent from the correlation value judging circuit 22, wiring of inputs of the weighting circuits 11 and 12 from the outputs of the correlators 18 and 19 is changed and thus an effect equivalent to that obtained by the weighting shift can be obtained.

Figure 17:
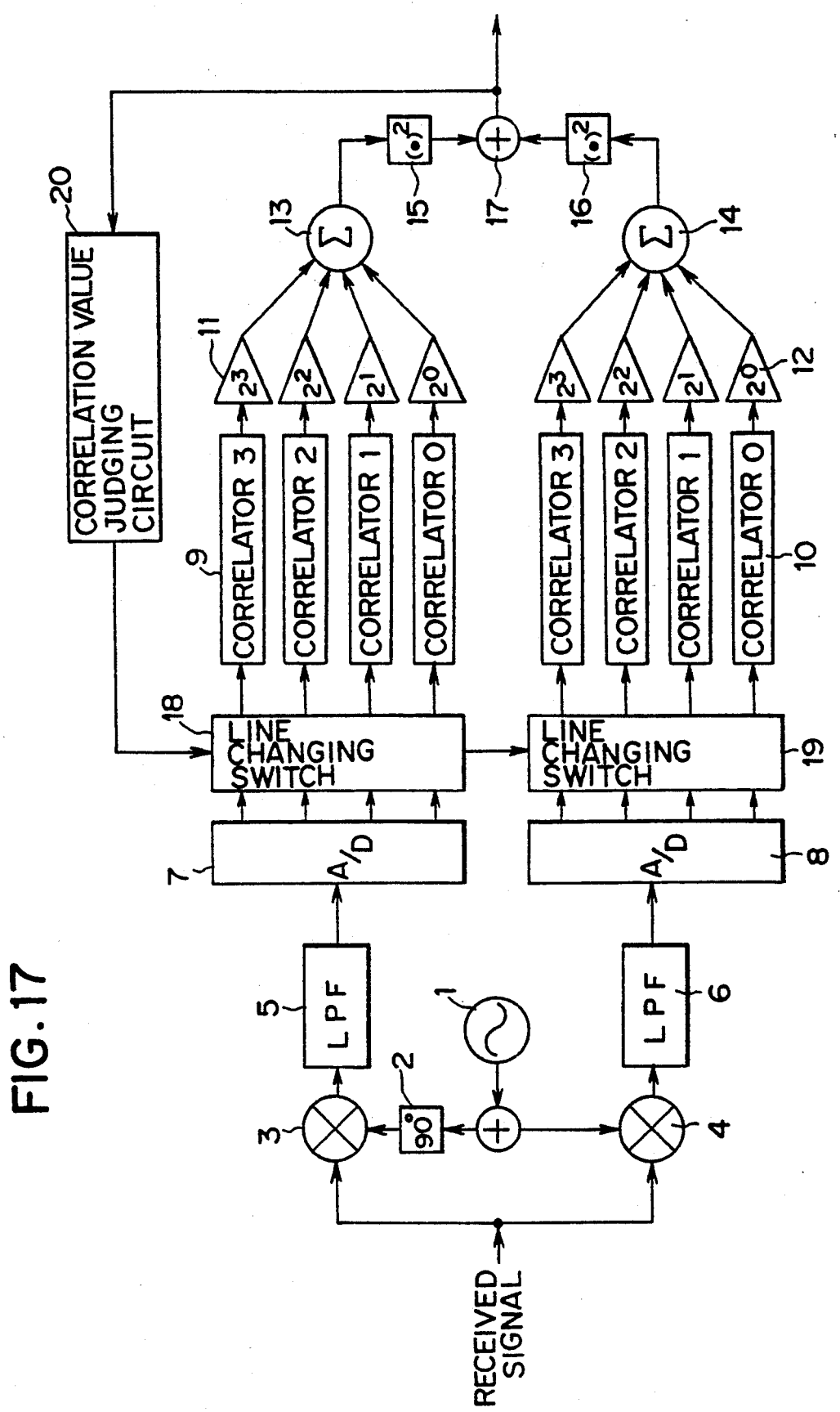
FIG. 17 is a block diagram showing the construction of a digital matched filter according to still another embodiment of the present invention.

Further the line changing switches 18 and 19 may be disposed on the input side of the correlators 9 and 10, as indicated in FIG. 17.

As explained above, owing to the circuit construction according to the present invention, e.g. in the SSC, the troublesome operation, i.e. electric power control on the transmitter side, is made unnecessary by using the digital matched filter described above and an excellent effect of eliminating disturbance in the SSC can be obtained.

Although, in the above embodiments, it was supposed that received wave is processed by two systems, it is obvious that the process can be effected by one system or more than three systems. In particular, using the digital matched filter indicated in FIG. 13, since it is unnecessary to shift the weighting factors the circuit construction can be simplified.

What is claimed is:

1. A digital matched filter comprising:
   frequency converting means for converting a received signal in frequency into a base band by using a signal having a same frequency as a carrier of the received signal;
   A/D converting means for converting a signal obtained by the frequency conversion into a multi-bit signal;
   a plurality of digital correlators for correlating different bit signals of said multi-bit signal with a set signal to output respective correlation values;
   a plurality of weighting means for weighting differently outputs of the different correlators;
   synthesizing means for combining outputs of said weighting means;
   a judging circuit for comparing an output of said synthesizing means with a predetermined value to output a control signal, based on a comparison result thus obtained; and
   control means for varying weighting factors, based on said control signal.

2. A digital matched filter according to claim 1, wherein said weighting means includes shift registers and said control means shifts contents of said shift registers, based on said control signal.

3. A digital matched filter according claim 1, wherein said control means includes line changing switches for changing lines for inputs of said digital correlators or lines for outputs thereof, based on said control signal.

4. A digital matched filter according to claim 2, wherein said control means includes a microcomputer and said microcomputer has a program for varying said weighting factors in response to said control signal.

* * * * *